(12) United States Patent
Tom et al.

(10) Patent No.: US 7,143,123 B2
(45) Date of Patent: Nov. 28, 2006

(54) WELL-KNOWN TRANSACTIONS IN DATA REPLICATION

(75) Inventors: Richard W. Tom, Seattle, WA (US); Kaushik Choudhury, Bellevue, WA (US); Qun Guo, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 492 days.

(21) Appl. No.: 10/754,236

(22) Filed: Jan. 9, 2004

(65) Prior Publication Data

US 2005/0165858 A1 Jul. 28, 2005

(51) Int. Cl.
*G06F 17/30* (2006.01)
(52) U.S. Cl. .................... 707/204; 707/201
(58) Field of Classification Search .............. 707/8, 707/10, 103 R, 201, 202; 709/224
See application file for complete search history.

(56) References Cited

U.S. PATENT DOCUMENTS

| | | | |
|---|---|---|---|
| 6,470,329 B1 | 10/2002 | Livschitz | 707/1 |
| 6,571,287 B1 | 5/2003 | Knight et al. | 709/225 |
| 6,662,196 B1 | 12/2003 | Holenstein et al. | 707/202 |

OTHER PUBLICATIONS

Oracle, Oracle9i Advanced Replication Release 2(9.2), 2002, pp. 1-15.*
Oracle Streams Replication Administrator's Guide 10g Release 1, Dec. 2003, pp. 1-1 to 14-6.*
Michael C. Morrison, The Growing Importance of Peer-to-Peer Replication, Sep. 2001, pp. 1-6.*
Yuri Breitbart, et al., Update Propagation Protocols For Replicated Databases, SIGMOD'99, 1999, pp. 97-108, Philadelphia, Pennsylvania.
Fernando Pedone, et al., Exploiting Atomic Broadcast in Replicated Databases, EuroPar'98, 1998, pp. 1-24.
Parvathi Chundi, et al., Multi-Site Distributed Database Transactions Utilizing Deferred Update, 1997 ACM symposium on Applied computing 1997, pp. 118-122.
Weimin Du, et al., Supporting Consistent Updates in Replicated Multidatabase Systems, VLDB Journal, 1993, pp. 215-241.

* cited by examiner

*Primary Examiner*—Apu M. Mofiz
(74) *Attorney, Agent, or Firm*—Amin & Turocy, LLP

(57) ABSTRACT

A well-known transactions feature in data replication that takes the "last seen" transaction watermark, stores the watermark for each source in a topology, and tags each transaction with information associated with its origin. The tagged data is called Originator Information, and contains, but is not limited to, information on the originating server, originating database, and the originating transaction. This technology provides users with a method to scale out (keep more than two nodes in synchronism with updates at all nodes), increase availability of data during limited network failures (multiple replication pathways), and improve recovery strategies (redeliver transactions upon restore).

34 Claims, 13 Drawing Sheets

OSN - ORIGINATING SERVER NAME (2-264 BYTES)
OPDN - ORIGINATING PUBLISHER DATABASE
   NAME (2-264 BYTES)
OPID - ORIGINATING PUBLICATION ID (4 BYTES)
OPDV - ORIGINATING PUBLISHER DATABASE
   VERSION (4 BYTES)
OTLSN - ORIGINAL TRANSACTION LAST TRANSACTION
   SEQUENCE NUMBER (16 BYTES)

WELL-KNOWN TRANSACTIONS IN DATA REPLICATION

TECHNICAL FIELD

This invention is related to data replication in networked computing systems, and more specifically, to well-known data transactions.

BACKGROUND OF THE INVENTION

Database replication is a process by which data residing in data tables at one location (the source location) are made available for use at other locations (the destination locations). In particular, it is the process of keeping the destination data, which resides in tables, synchronized with the source data contained in the source tables.

Transactional replication is a form of replication that moves the data changes from the source to the destination while preserving the transactional state of the source system such that the destination data always represents a distinct committed state of the source data. Transactional replication insures that the destination tables continue to reflect the transactional consistency of the replicated source tables. This can be contrasted with non-transactional replication systems that move the changes from the source to the destination and commit them in a way that does not guarantee that the state of the destination tables matches a particular transactional state of the data from the source tables. In transactional replication, there is typically one source to many destinations.

Peer-to-peer replication is a form of transactional replication in which every node in the topology acts as both a source and a destination. This form of replication is unique because it enables users to create topologies with many sources to many destinations, perform updates at every node in the topology and restore transactions to a node that failed after replicating to its peers while preserving transactional consistency. A key to this technology is the ability to track the originator of a transaction.

Peer-to-peer transactional replication is based on a very simple rule; all transactions in the configuration are well-known transactions. Each source either generates a well-known transaction or forwards a well-known transaction. Replication agents, upon distributing a well-known transaction, can decide in an unambiguous manner whether it needs to apply it at the destination or whether the destination has already received the transaction via an alternate replication path.

The transactional replication process can be separated into two main phases. The first phase is the tracking or harvesting of the changes at the source. Typically, there are two forms of harvesting: log-based, and trigger-based. Log-based harvesting uses a log reader agent to track the source changes as they occur by reading the source database transaction log. The database transaction log contains all changes that have occurred on the database such that they can be ordered by the commit time. Trigger-based tracking employs replication triggers that are used for this type of change tracking, which replication triggers are constructed in such a way that an insert, update, or delete on each of the replicated tables causes the trigger code to execute. This executed code in turn stores information about the change that has occurred. The well-known transaction feature can be implemented with both methods of harvesting.

The second phase in the transactional replication process is the delivery of those changes to the destination (also called distribution using a distribution agent). During the distribution phase the replication agent delivers transactions that were harvested after the last synchronization between the source and the destination. In transactional replication, the destination server keeps track of a "last seen" watermark from every source from which it receives a change. This watermark is the starting point for the next distribution phase between one source and one destination. While this watermark allows the replication agent to avoid redelivering commands from one source that has already distributed them to a destination, it is not sufficient for a topology with multiple replication pathways. By way of example, consider three nodes A, B, and C in a ring topology, where A is the source node and, B and C are the destination nodes. Note that node C uses node B as a second source. Effectively this means that C can receive A's changes directly from A or through B. Because the watermarks for sources A and B (relative to node C) do not normally contain any information about the originator of the changes, it is virtually guaranteed that A will deliver it's commands to C, and B will redeliver these commands on behalf of A, resulting in conflicts.

What is needed is an improved transactional data replication architecture.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Peer-to-peer transactional replication is based on a very simple rule; all transactions in the configuration are well-known transactions. Each source either generates a well-known transaction or forwards a well-known transaction. Replication agents, upon distributing a well-known transaction, can decide in an unambiguous manner whether it needs to apply it at the destination or whether the destination has already received the transaction via an alternate replication path.

The present invention disclosed and claimed herein, in one aspect thereof, comprises a well-known transactions feature that takes the "last seen" transaction watermark, stores the watermark for each source in a topology, and tags each transaction with information associated with its origin. The tagged data is called Originator Information (OI), and contains, but is not limited to, information on the originating server, originating database, and the originating transaction. This technology provides users with a method to scale out (keep more than two nodes in synchronism with updates at all nodes), increase availability of data during limited network failures (multiple replication pathways), and improve recovery strategies (redeliver transactions upon restore).

Local changes, or transactions that are generated by clients other than replication agents, can be tagged with the OI data upon commit or during the harvesting phase (by a log reader agent). Non-local changes, or transactions that arrive at a destination database via a replication agent, must be applied at the destination in a manner that preserves the OI data at the original transaction boundaries. What this means is that even if multiple transactions are batched into one commit by the distributing agent, the OI data must be written to the log in such a way that the harvesting agent (or triggers) can detect the original transactions and the associated OI data.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
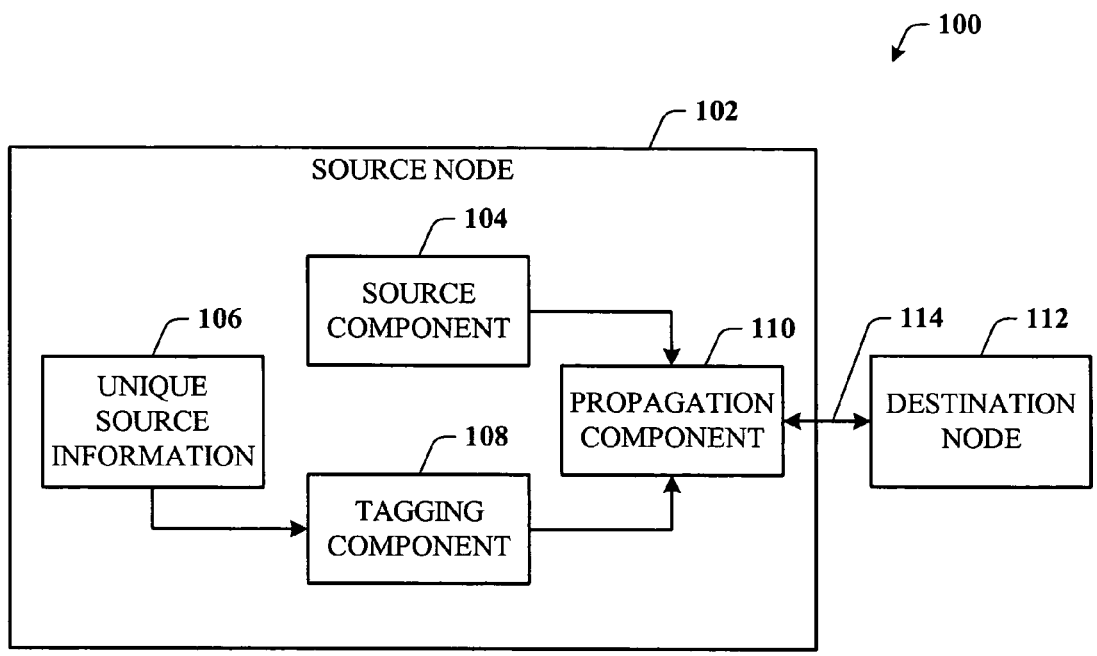
FIG. 1 illustrates a system that facilitates data replication in a data network in accordance with the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

A goal is transaction consistency in data replication in a network topology, for example, a peer-to-peer topology. Previously, only two nodes (servers, principally) could be kept in synchronism using this form of replication. In transactional replication, every transaction that is committed at the publisher is sent and applied to the subscriber.

In accordance with the disclosed architecture, N nodes can now be connected in a topology that provides transactional consistency (i.e., every transaction applied at one node will arrive at every other node). In addition, loops are allowable within the topology. This is useful for updating multiple sites, allowing each site to update, and allowing each site to receive data through any path of the topology. Traditionally, transactional replication would use a hub/spoke topology, where the hub sends out one command to multiple subscribers. The disclosed architecture allows a ring topology, and increase fault tolerance. For example, if the connection is lost between publisher and one of the subscribers, the subscriber can receive the data from another subscriber. Another advantage is a set of caching servers. Since all nodes stay synchronized, and all nodes can act as publishers, there now exists multiple sites for failovers, write and read scalability, etc.

Previous peer-to-peer implementations were never able to keep track of where a transaction originated. Thus, in a conventional peer-to-peer ring topology of three nodes A, B, and C where a change occurred on A, a transaction was sent to C, and C would replicate to B, but B did not know whether the transaction came from A or C. When the change arrived at A, A would want to send it back to B and C causing duplication, and consuming unnecessary network bandwidth. Now, each transaction is tagged with originator information such that the origin of the transaction is well known.

Where multiple nodes have the data, the node that synchronizes first applies the data. That node has the transactional isolation at that point, and the others nodes will stop attempting to synchronize. The lowest common denominator is that when the system is synchronized, all nodes have the same data. If one node has more data, then the other nodes will receive it.

The disclosed architecture can be configured to provide the user the capability to select between purely transactional flow and non-transactional flow. The default setting is transactional. However, non-transactional flow can be supported, where only the delta changes are propagated. Reconciliation will preserve transactional integrity.

Referring now to FIG. 1, there is illustrated a system 100 that facilitates data replication in a network in accordance with the present invention. The system 100 includes a source node 102 having a source component 104 that generates state change information related to source information. The source node 102 has associated therewith unique source information 106 that uniquely identifies the source node 102. There is further provided a tagging component 108 that tags the state change information with the unique source information 106 when propagating the state change information from the source node 102 to a destination node 112 over a network connection 114 using a propagation component 110. Note that the network connection can be a wired/wireless technology for any type of device-to-device communication connection, including serial peer-to-peer connection, a LAN, WAN, and Internet connection, for example. Note also, that the tagging component 108 and the propagation component 110 can be combined as a single component. Additionally, the tagging component 108 and/or the propagation component 110 can be separate from the server engine, or embedded as part of the server engine such that the engine automatically tags the data in accordance with the present invention.

The present invention comprises a well-known transactions feature that stores a watermark for each source in a topology, and tags each transaction with the watermark information associated to uniquely identify its origin. The tagged data is called Originator Information (OI), and contains, but is not limited to, information on the originating server, originating database, and the originating transaction. This technology provides users with a method to scale out (keep more than two nodes in synchronism with updates at all nodes), increase availability of data during limited network failures (multiple replication pathways), and improve recovery strategies (redeliver transactions upon restore). The present invention contemplates application to peer-to-peer topologies, as well.

Local changes, or transactions that are generated by clients other than replication agents, can be tagged with the OI data upon commit or during a harvesting phase. Non-local changes, or transactions that arrive at the destination node via a replication agent, are applied at the destination in a manner that preserves the OI data at the original transaction boundaries. What this means is that even if multiple transactions are batched into one commit by the distributing agent, the OI data is written to the log in such a way that the log reader harvesting agent (or triggers) can detect the original transactions and the associated OI data.

Figure 2:
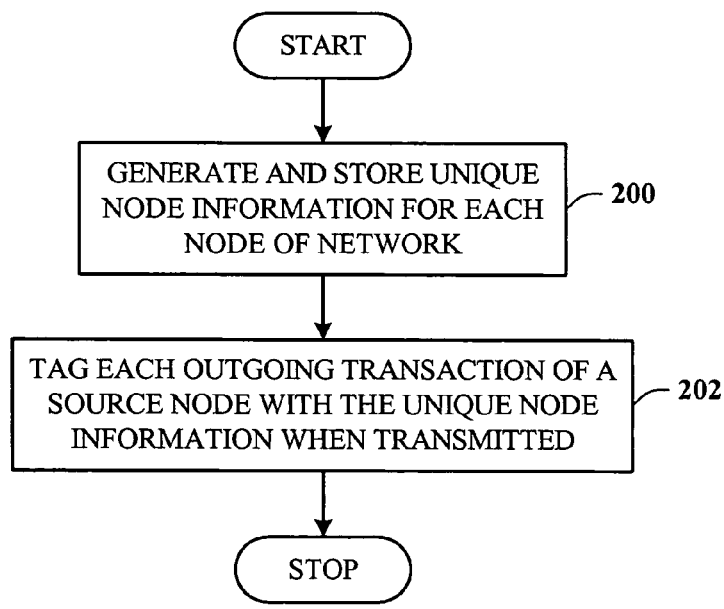
FIG. 2 illustrates a flow chart of a process according to the present invention.

Referring now to FIG. 2, there is illustrated a flow chart of a process according to the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 200, unique node information is generated and stored at each node of the network. At 202, an outgoing message from each node is tagged with the unique node information such that each destination can determine the originator of the message. The process then reaches a Stop block.

SQL server supports multi-layer transactional replication through the subscriber re-publisher paradigm. Cyclic replication between two nodes (bi-directional replication) is also supported using loop back detection. Updating subscriber replication offers some flexibility in ease of use and conflict handling, but lags in performance. The current features of transactional replication restrict the ability of customers use in large complex configurations where there are multiple data replication paths and multiple loops from one or more publisher to one or more subscriber.

The disclosed architecture offers the capability to use transactional replication in a more flexible way by allowing the customer to create any network of publisher-subcriber pairs, even networks that contain "redundant data paths" and "loops." This complements the current feature set of transactional replication in a way that enables the customer to create more fault-tolerant and scalable replication networks, because changes can be replicated via more than one path. Furthermore, the architecture can be extended to use a heterogeneous publisher or subscriber.

The disclosed architecture finds application with peer-to-peer topologies to facilitate improvements for dealing with the complexities of data origins. Peer-to-peer transactional replication extends some of the core assumptions that hold true today for bidirectional and multi-publisher transactional replication. If two publishers update the same result set on a subscriber, then the update that is processed last, wins. In other words, the customer ensures that the data is partitioned in a way such that only one publisher is changing data at a time. Related to another assumption, as nodes are added to a peer-to-peer network, it is possible to validate if data replication requirements are being met.

Bi-directional replication and forward republishing are supported (as these are subsets of the peer-to-peer replication) and do not use architecture based on the existing loop back detection at server database level.

Figure 3:
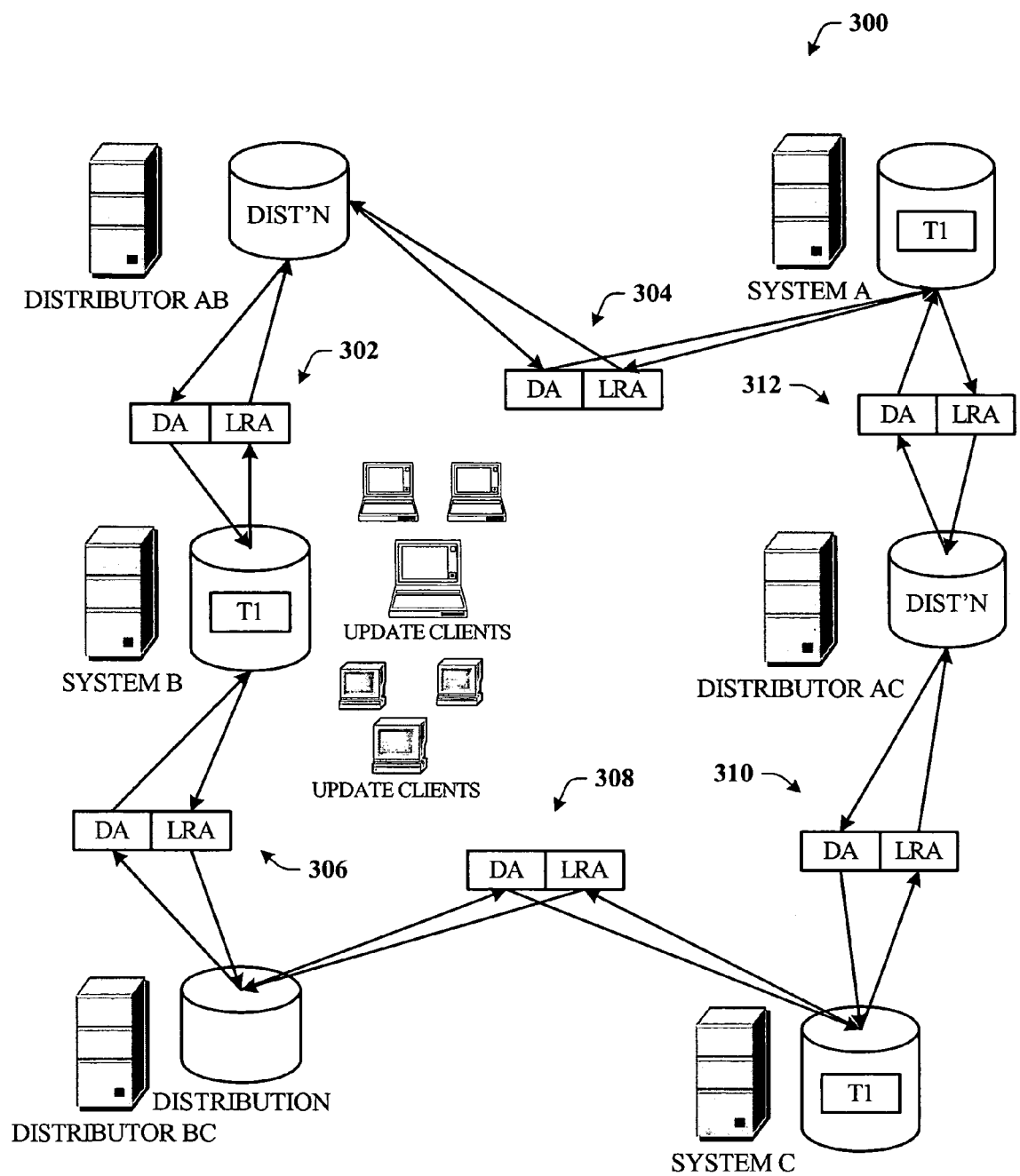
FIG. 3 illustrates a block diagram of a system for an alternate replication topology embodiment of the present invention.

Referring now to FIG. 3, there is a block diagram of a system 300 that illustrates an alternate replication topology of the present invention. Three systems A, B, and C need to stay in synchronism with employee data that is stored in table T1, but only a single (local) system B can make updates to the data. If one of the systems A, B, and C fails, the associated data area could simply failover to another system without any interruption in service. System A can be repaired from a failover by rollback and restore of the System A database from Systems B and C. As long as one node in the topology has the data, the data can be retrieved and the lost database of the failed node restored to the current state. Thus, only those transactions that are missing from System A can be requested for redelivery to System A from Systems B and C. Moreover, all transactions that were sent out from System A but lost during the failure can be requested from Systems B and C to reconstitute System A. This is possible because of the novel tagging aspect of the present invention provides that the origin of the data is now well known. The user is provided the capability to implement this scenario in one of two ways: each system A, B, and C will either contain two publications with one subscriber for each (allowing two different distributors), or a single publication with two subscribers.

In SQL server data replication, the basic components are articles, distributors, publications, publishers (or data source), and subscribers (or data destination). An article is the basic replication unit. That is, the article represents what is being published. An article can be data from a table or a database object, such as an entire table, or even a stored procedure. All articles must belong to a publication. A distributor is a SQL server system that is responsible for transferring the replicated data between the publisher and the subscriber. For small-scale replications, the Distributor and the publisher are usually parts of the same system. For large-scale replication, the Distributor is often implemented as a separate system. A publication represents a group of articles. A subscriber can subscribe to a publication, as well as to individual articles. The publisher is responsible for making the data available for replication, and contains the master replication database. The publisher extracts from its database the information to be replicated, and forward this information to the distributor, which can be on the same system.

Distributor systems are provided interstitial to respective peer systems A, B, and C, and comprise the following: Distributor AB between system A and system B; Distributor AC between system A and C; and Distributor BC between system A and system C. Each Distributor system has an associated distribution database that is accessible by a distributor agent (DA) and a log reader agent (LRA). The LRA tracks and harvests the data changes of the source as they occur by reading the source database transaction log. The DA delivers these data changes to the destination that were harvested after the last synchronization between the source and the destination. The agents provide the data interface between the distribution databases of the systems. There is illustrated first and second DA/LRA pairs 302 and 304 for moving data between system B and system A; third and fourth DA/LRA pairs 306 and 308 for moving data between system B and system C; and, fifth and sixth DA/LRA pairs 310 and 312 for moving data between system C and system A.

Figure 4:
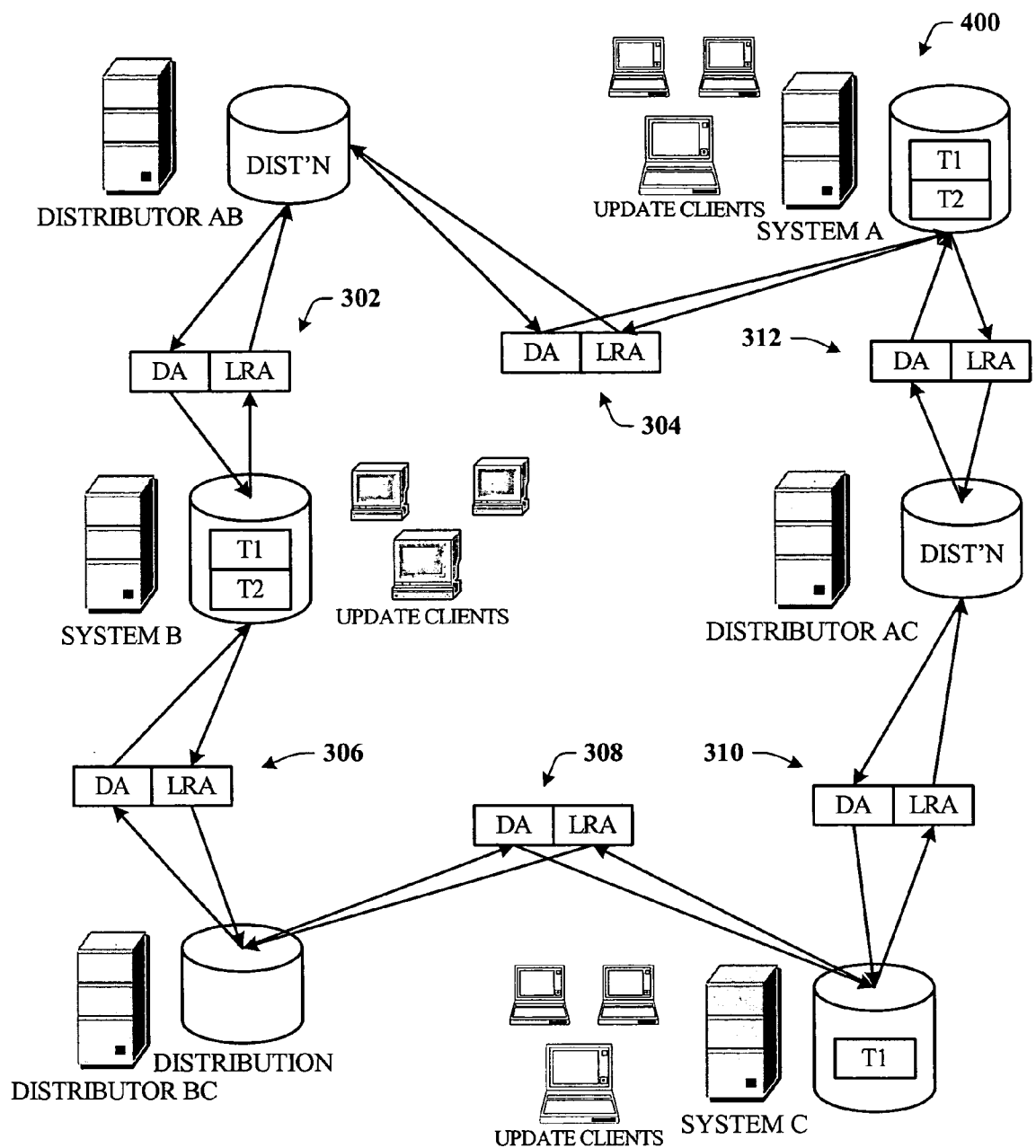
FIG. 4 illustrates a block diagram of a system for peer-to-peer replication using multiple publications in accordance with the present invention.

Referring now to FIG. 4, there is a block diagram of a system 400 for peer-to-peer replication using multiple publications in accordance with the present invention. Here, certain subscribers will be interested only in certain parts of the data. In that case, it is desired to provide redundancy for that data. In this example, system A is interested in the data of both tables T1 and T2 of system B; whereas, system C is not interested in data inside table T2 of the system B (e.g., sales information inside the US). However, system C can still serve as a redundancy point for Employee data in table T1.

As before, distributor systems are provided interstitial to respective peer systems A, B, and C: Distributor AB between system A and system B; Distributor AC between system A and C; and Distributor BC between system A and system C. Each Distributor system has an associated distribution database that is accessible by the DA and LRA. The agents provide the data interface between the distribution databases of the systems. There is illustrated the first and second DA/LRA pairs 302 and 304 for moving data between system B and system A; the third and fourth DA/LRA pairs 306 and 308 for moving data between system B and system C; and, the fifth and sixth DA/LRA pairs 310 and 312 for moving data between system C and system A.

System A can be repaired from a failover by rollback and restore of the System A database from Systems B and C. As long as one node in the topology has the data, the data can be retrieved and the lost database of the failed node restored to the current state. Thus, only those transactions that are missing from System A can be requested for redelivery to System A from Systems B and C. Moreover, all transactions that were sent out from System A but lost during the failure can be requested from Systems B and C to reconstitute System A. This is possible because of the novel tagging aspect of the present invention provides that the origin of the data is now well known.

Figure 5:
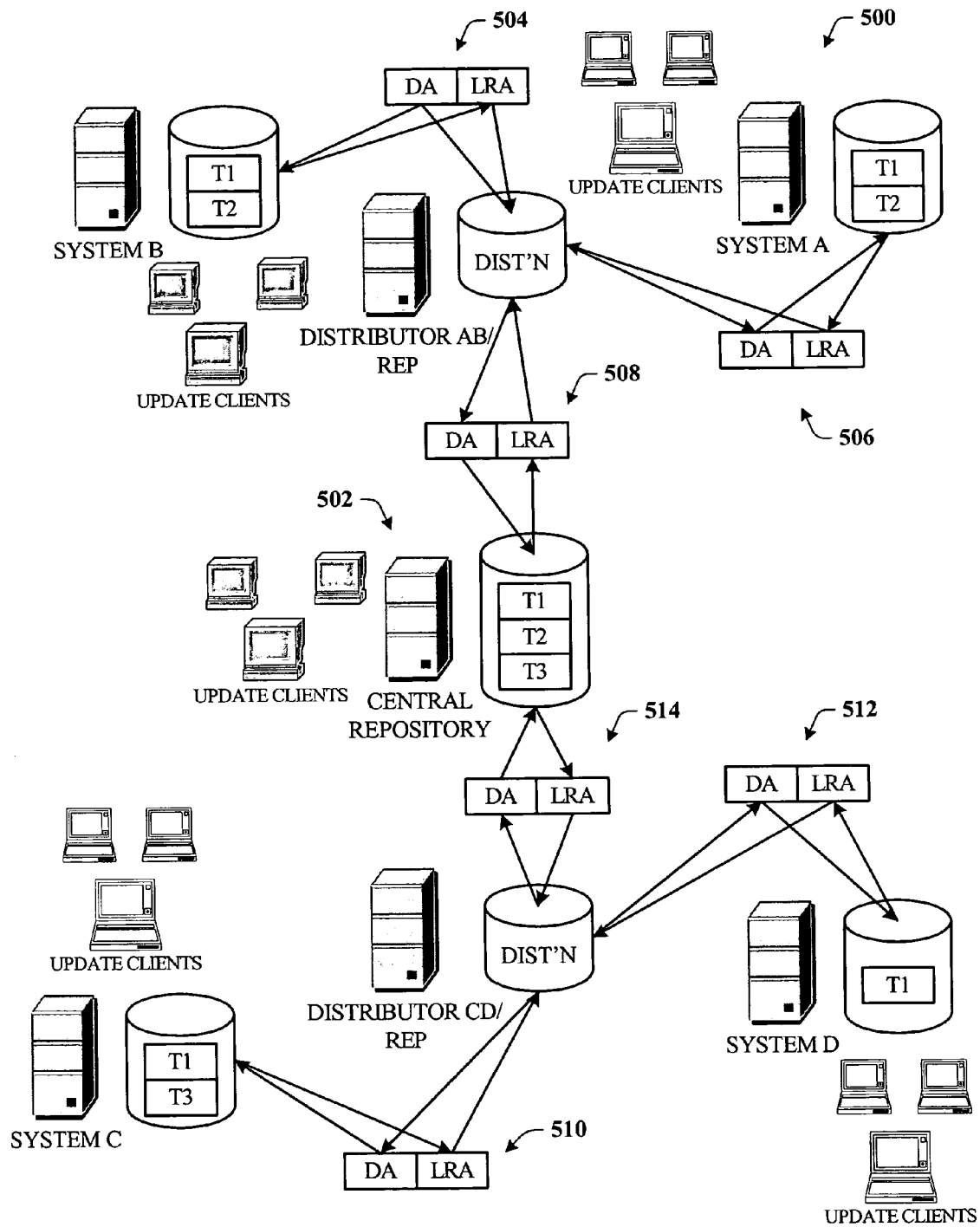
FIG. 5 illustrates block diagram of a system for peer-to-peer replication in accordance with the present invention.

Referring now to FIG. 5, there is a block diagram of a system 500 for peer-to-peer replication in accordance with the present invention. The user can set up any configuration of multi-way publishers-subscribers, as long as the partitioning criteria are met. Here, four systems A, B, C, and D interact with a central data repository 502 and between each other. In support thereof, there is provided Distributor AB/REP for data exchange between systems A and B, and the central data repository 502. Both of systems A and B include data related to tables T1 and T2. The central repository 502 stores data related to tables T1, T2, and T3. Two DA/LRA pairs 504 and 506 are provided to facilitate data exchange for replication between system B and system A. A third DA/LRA pair 508 is provided between Distributor AB/REP and the repository 502.

Similarly, there is provided Distributor CD/REP for data exchange between systems C and D, and the central data repository 502. System C includes data related to tables T1 and T3, while system D includes data related to table T1. Two DA/LRA pairs 510 and 512 are provided to facilitate data exchange for replication between system C and system D. A sixth DA/LRA pair 514 is provided between Distributor CD/REP and the repository 502. Thus, each system A, B, C, and D, and the repository 502 can function both as a publisher and a subscriber.

As before, System A can be repaired from a failover by rollback and restore of the System A database from Systems B, C, D, and the repository 502. As long as one node in the topology has the data, the data can be retrieved and the lost database of the failed node restored to the current state. Thus, only those transactions that are missing from System A can be requested for redelivery to System A from Systems B, C, D, and the repository 502. Moreover, all transactions that were sent out from System A but lost during the failure can be requested from Systems B, C, D, and the repository 502, to reconstitute System A. This applies to any of the nodes (System A, B, C, D, and the repository 502) that has a failover, and requires data restoration. This is possible because of the novel tagging aspect of the present invention provides that the origin of the data is now well known.

Architecture

Figure 6:
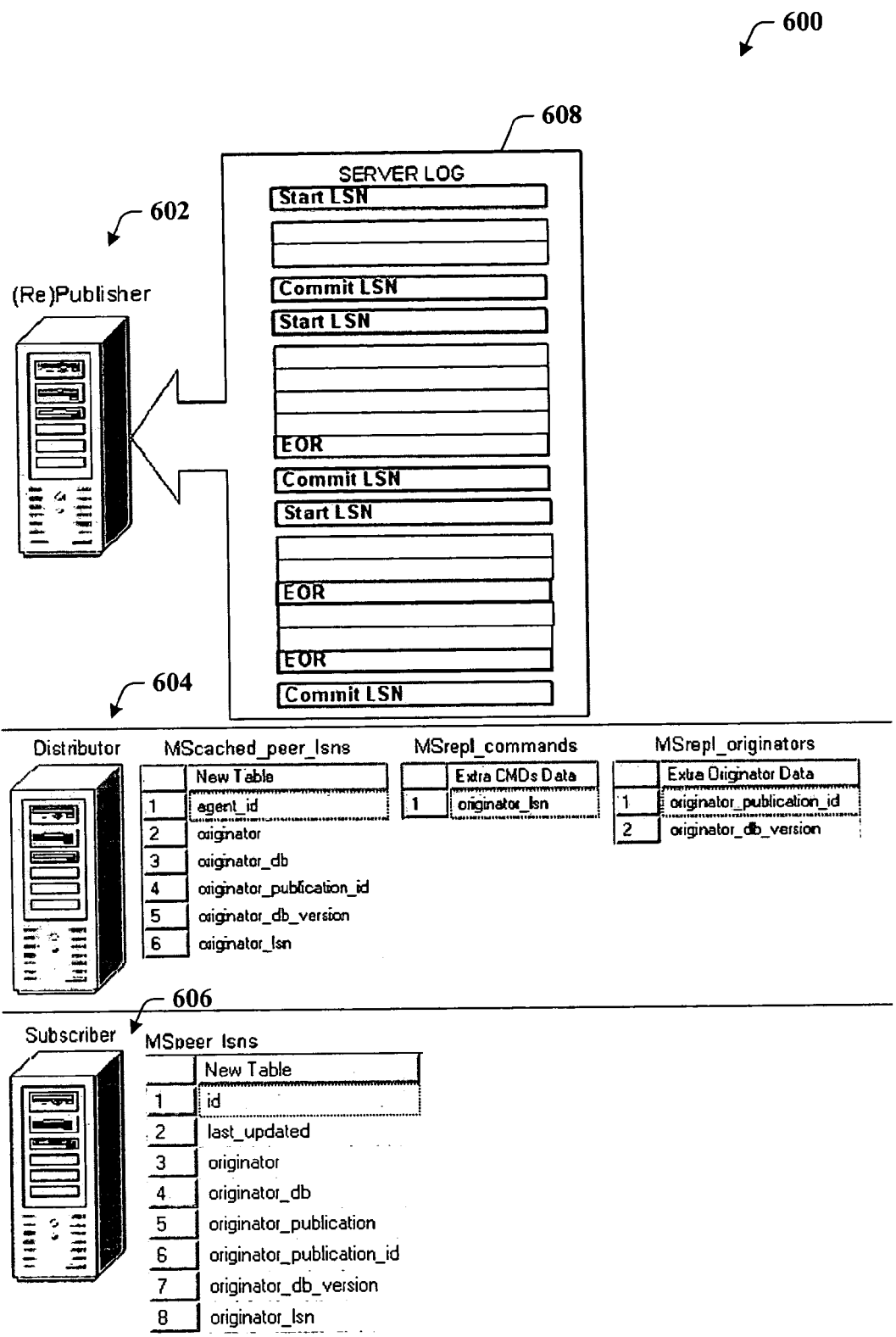
FIG. 6 illustrates basic peer-to-peer tables for a (re) publisher, distributor, and subscriber, in accordance with the present invention.

Referring now to FIG. 6, there is illustrated basic peer-to-peer tables 600 for a (re)publisher 602, distributor 604, and subscriber 606, in accordance with the present invention. The (re)publisher 602 includes a server log 608 that records Start LSN data, Commit LSN data, and EOR data. The distributor 604 includes at least three tables: an MScached_peer_lsns table; an MSrepl_commands table; and an MSrepl_originators table. The subscriber 606 includes a single table: an MSpeer_sns table. Each of these will be described in detail hereinbelow.

Peer-to-peer transactional replication works based on a very simple rule; all transactions in the configuration are well-known transactions. Each publisher either generates a well-known transaction or forwards a well-known transaction. Each subscriber, upon receiving a well-known transaction, can decide in an unambiguous manner whether it needs to apply it. The log reader agent and distribution agent can process all the transactions as well-known transactions.

Publication Level Properties

Enable Log for peer-to-peer Replication (@enabled_for_p2p). This is a publication level property that can have one of the values—TRUE or FALSE. If TRUE, local changes made on the server for the publication will be presented in a format that enables the changes to flow through a peer-to-peer transactional replication configuration. A value of FALSE implies that the existing old behavior will be maintained.

Forward local changes only (@publish_local_changes only). This is a publication level property can have one of the values—TRUE or FALSE. If TRUE, it means the publisher will accept and forward well known transactions from other publishers. For this property to be TRUE—it requires the property @enabled_for_p2p to be TRUE. A value of FALSE implies that the publisher will not forward well known transactions from other publisher in the configuration. Only local changes will be published out. This property would mainly be used between two nodes and/or a well-connected topology (all nodes subscriber and republish to one another) with a single node performing updates.

The main issue here is that in peer-to-peer there may not be way of regulating which agent runs first. @publish_local_changes_only can result in non-convergence for a variety of scenarios such as the following. Assume a three node topology (A, B and C), and all publications have set @publish_local_change_only=TRUE. Node A performs an INSERT on a row, runs the log reader, and distributes to destination machine B. B performs an UPDATE on the same row, runs the log reader, and attempts to distribute the command to machine C. The command fails to apply, because the row does not yet exist on machine C.

If the @publish_local_changes_only was set to false, the following would have occurred. Assume the same three node topology (A, B and C) as above. Node A performs an INSERT on a row, runs the log reader, and distributes to machine B. B performs an UPDATE on the same row, runs the log reader, and distributes the command for the INSERT from A first, and then it's local UPDATE to C.

Extending Meta-Data On The Distributor

The main difference is that each command is tagged with an originating LSN value and the originator information has been extended.

If the command is for a publication that is not enabled for peer-to-peer, the originator_lsn value is NULL to save storage.

```
create table dbo.MSrepl_commands
(
    publisher_database_id      int not null,
    xact_seqno                 varbinary(16) not null,
    type                       int not null,
    article_id                 int not null,
    originator_id              int not null,
    command_id                 int not null,
    partial_command            bit not null,
    command                    varbinary(1024) NULL,
    hashkey                    int default 0,
    originator_lsn             varbinary(16) NULL
)
```

If the originator is not for a publication that is enabled for peer-to-peer, the publication_id and dbversion will be null.

```
create table dbo.MSrepl_originators
(
    id                     int identity not null,
    publisher_database_id  int not null,
    srvname                sysname not null,
    dbname                 sysname not null,
    publication_id         int NULL,
    dbversion              int NULL
)
```

The reading and distribution of commands in a peer-to-peer scenario is very similar to normal transactional replication commands processing. The main difference is in the number of LSN watermarks used by sp_MSget_repl_commands. In the normal case, joining is on one LSN watermark (subscription sequence number) to determine which commands in MSrepl_commands should be returned to the subscriber. In a peer-to-peer scenario, joining is on one LSN watermark for every publication in the topology. The following table contains the watermarks used by sp_MSget_repl_commands.

```
create table dbo.MScached_peer_lsns
(
    agent_id                    int,
    originator                  sysname,
    originator_db               sysname,
    originator_publication_id   int,
    originator_db_version       int,
    originator_lsn              varbinary(16)
)
```

Extending Meta-Data on The Publisher/Subscriber

Every subscriber knows the last received transaction (original TLSN) for each publication in the topology. A unique originating publication is defined as a combination of the following:

[Server Name].[DB Name].[Publication ID].[DB Version]

The following table has been added to every Publisher database and any Subscriber database that has a subscription to a peer-to-peer publication.

This table tracks the actual watermark (last transaction sequence number seen) for a particular originating publication.

```
CREATE TABLE dbo.MSpeer_lsns
(
    id                          int identity(1,1) primary key,
    last_updated                datetime default getdate( ),
    originator                  sysname,
    originator_db               sysname,
    originator_publication      sysname,
    originator_publication_id   int,
    originator_db_version       int,
    originator_lsn              varbinary(16),
)
```

Figure 7:
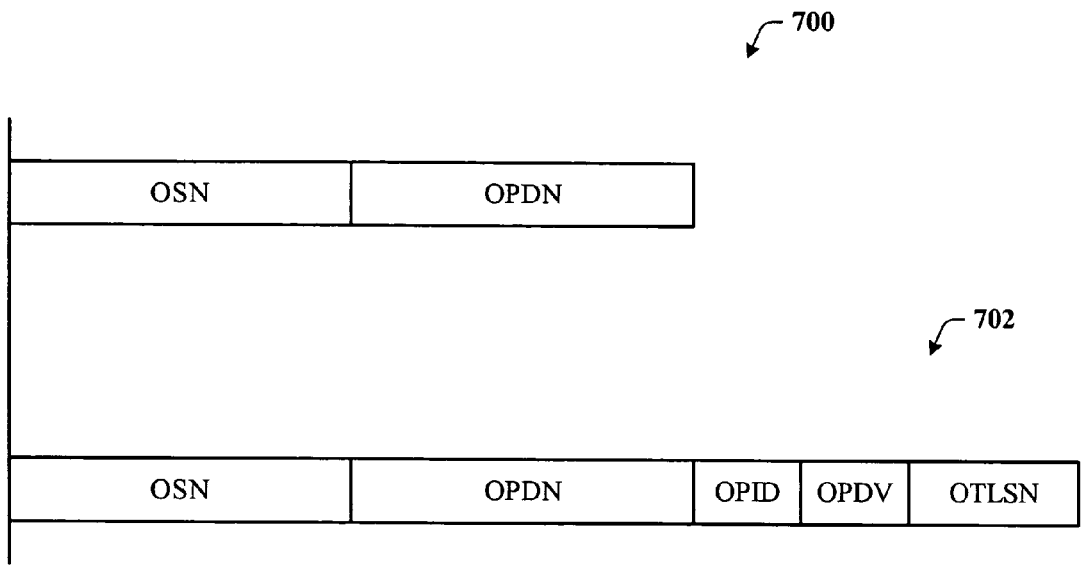
FIG. 7 illustrates a Simple Originator log Record (SOR) and an Extended Originator log Record (EOR) in accordance with the present invention.

Referring now to FIG. 7, there is illustrated a Simple Originator log Record (SOR) 700 and an Extended Originator log Record (EOR) 702 in accordance with the present invention. The SOR 700 the current log record used for marking transactions that are republished. It is used to qualify local transactions from immediate publisher, in cases where peer-to-peer replication is not enabled. The log record contains the following information: originating server name (OSN) and originating publisher database name (OPDN). The EOR 702 is a new kind of replication specific log record used to qualify well-know transactions. The EOR 702 contains the following information about the originating publication: OSN (from 2 to 264 bytes); OPDN (from 2 to 264 bytes); originating publication ID (OPID) (4 bytes); originating publisher database version (OPDV) (backup/restore GUID from dbinfo) (4 bytes); and original transaction LSN (last transaction sequence number)(commit LSN) (OTLSN) (16 bytes).

The EOR data 702 will always fit on one log record. At most, the record contains 546 bytes of data, assuming that the server and publisher database name are 132 characters each. Note that only non-locally generated commands will have EOR's following them in the log, but all commands stored in the distribution database will contain EOR data. Because every command that is delivered by the agent is considered non-local, EOR's are written to the log by the distribution agent. The log reader handles tagging locally generated commands with EOR data prior to storing them in the distribution database.

Figure 8:
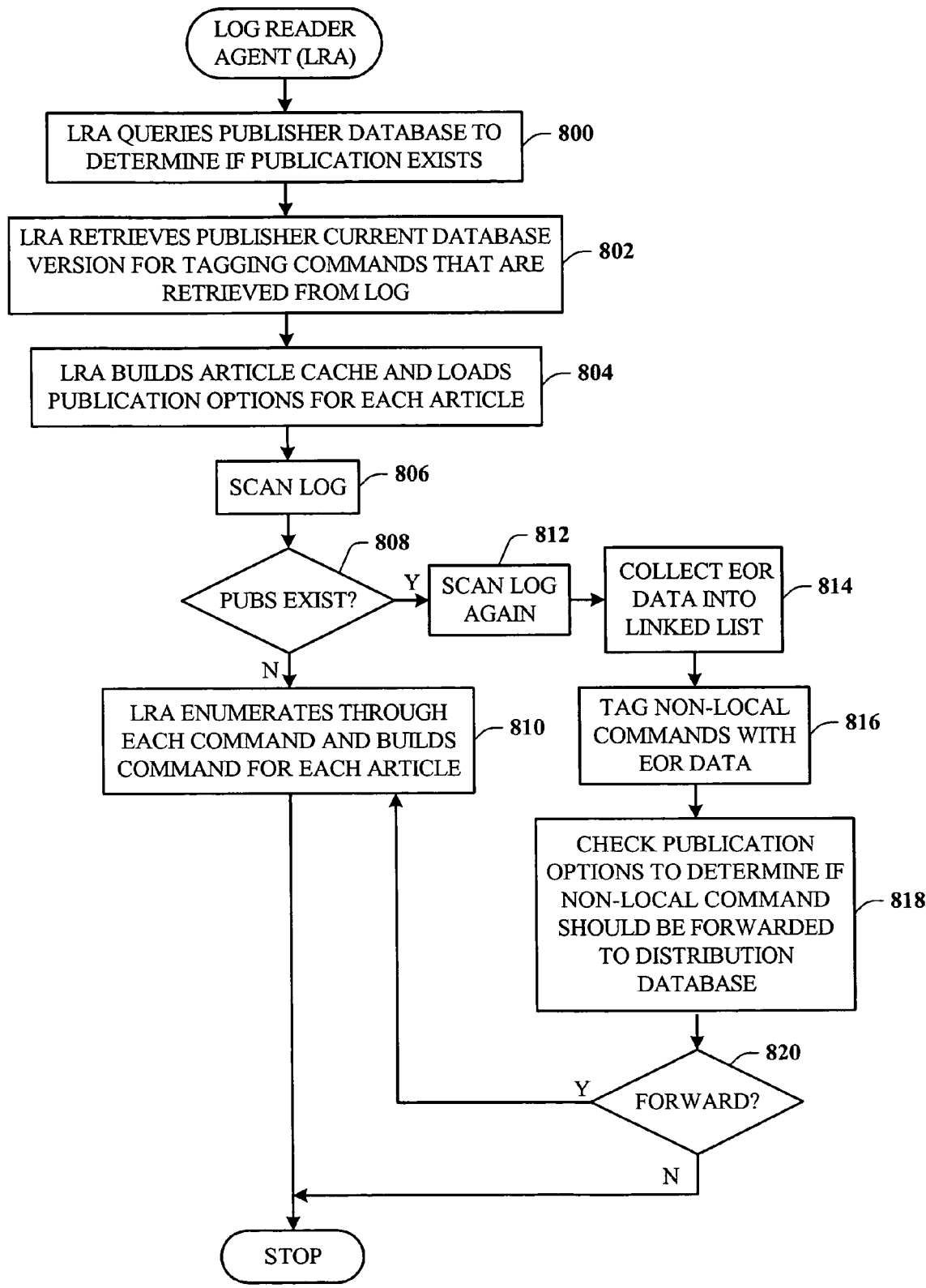
FIG. 8 illustrates a flow chart of a process of a log reader agent (LRA) in accordance with the present invention.

Referring now to FIG. 8, there is illustrated a flow chart of a process of a log reader agent (LRA) in accordance with the present invention. At 800, prior to scanning the log, the LRA queries the publisher database to determine if a publication exists in the database. At 802, the LRA retrieves the current publisher database version. This version value is used to tag local commands that need to be retrieved from the log. In addition, at 804, the LRA build the article cache, and as the LRA builds the article cache, it loads the publication options for each article. At 806, the LRA performs a scan of the log. At 808, the LRA determines if any publications exist in the publisher database. If NO, flow is to 810 where the LRA enumerates through each command and begins to construct the command for each article. Flow is then to a Stop block. On the other hand, if publications exist in the publisher database, flow is from 808 to 812 to perform a second scan of the log. During this second pass, the LRA collects all EOR information into a linked list, as indicated at 814. At 816, this information is used to tag all non-local commands with EOR data. At 818, the LRA checks the publication options to determine if the non-local command should be forwarded (i.e., @publish_local_changes_only='true') to the distribution database. At 820, if it is to be forwarded, flow is to back to 810 to enumerate through each command and build a command for each article. All local commands are always forwarded to the distribution database. Flow is then to the Stop block. If the command is not a local command, it will not be forwarded, and flow is from 820 to the Stop block.

Figure 9:
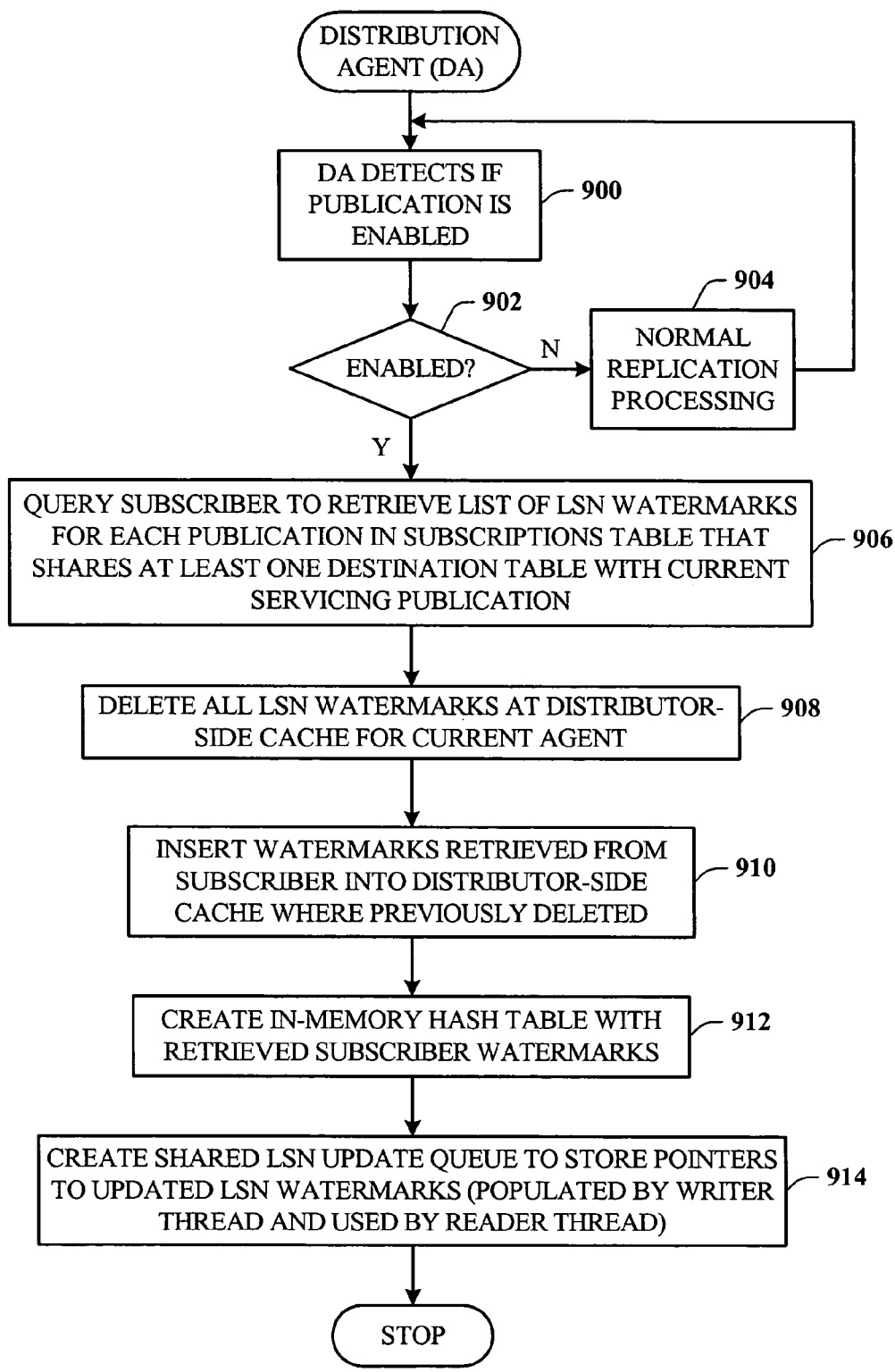
FIG. 9 illustrates a flow chart of a process of a distribution agent (DA) in accordance with the present invention.

Referring now to FIG. 9, there is illustrated a flow chart of a process of a distribution agent (DA) in accordance with the present invention. One difference between command distribution for peer-to-peer publications and regular publications is the number of LSN watermarks used by sp_MSget_repl_commands. In the normal case, joining is on one LSN watermark (subscription sequence number) to determine which commands in MSrepl_commands should be returned to the subscriber. In a peer-to-peer scenario, joining is on one LSN watermark for every publication in the topology.

Prior to command distribution, the DA detects if the publication is enabled, as indicated at 900. (Note that this also applies to peer-to-peer (P2P) topologies, as well.) If NO, flow is from 902 to 904 to perform normal replication processing. Flow is then back to the input of 900 to check for publication. If YES, flow is from 902 to 906 where the DA queries the subscriber and retrieves an initial list of LSN watermarks for each publication in the MSpeer_subscriptions table that shares at least one destination table with the current servicing publication. At 908, all LSN watermarks at the distributor side cache (MScached_peer_lsns table) are deleted for the current agent. At 910, the LSN watermarks retrieved from the subscriber are inserted into the distributor side cache that was previously cleared. At 912, an in-memory hash table is created with the LSN retrieved watermarks. The hash table is kept current, and is used to verify that commands being applied to the subscriber have not been previously applied. At 914, a shared LSN update queue is created that will house pointers to updated LSN watermarks. The queue is populated by a writer thread and used by a reader thread to update the distributor side cache. The process then reaches a Stop block.

Figure 10:
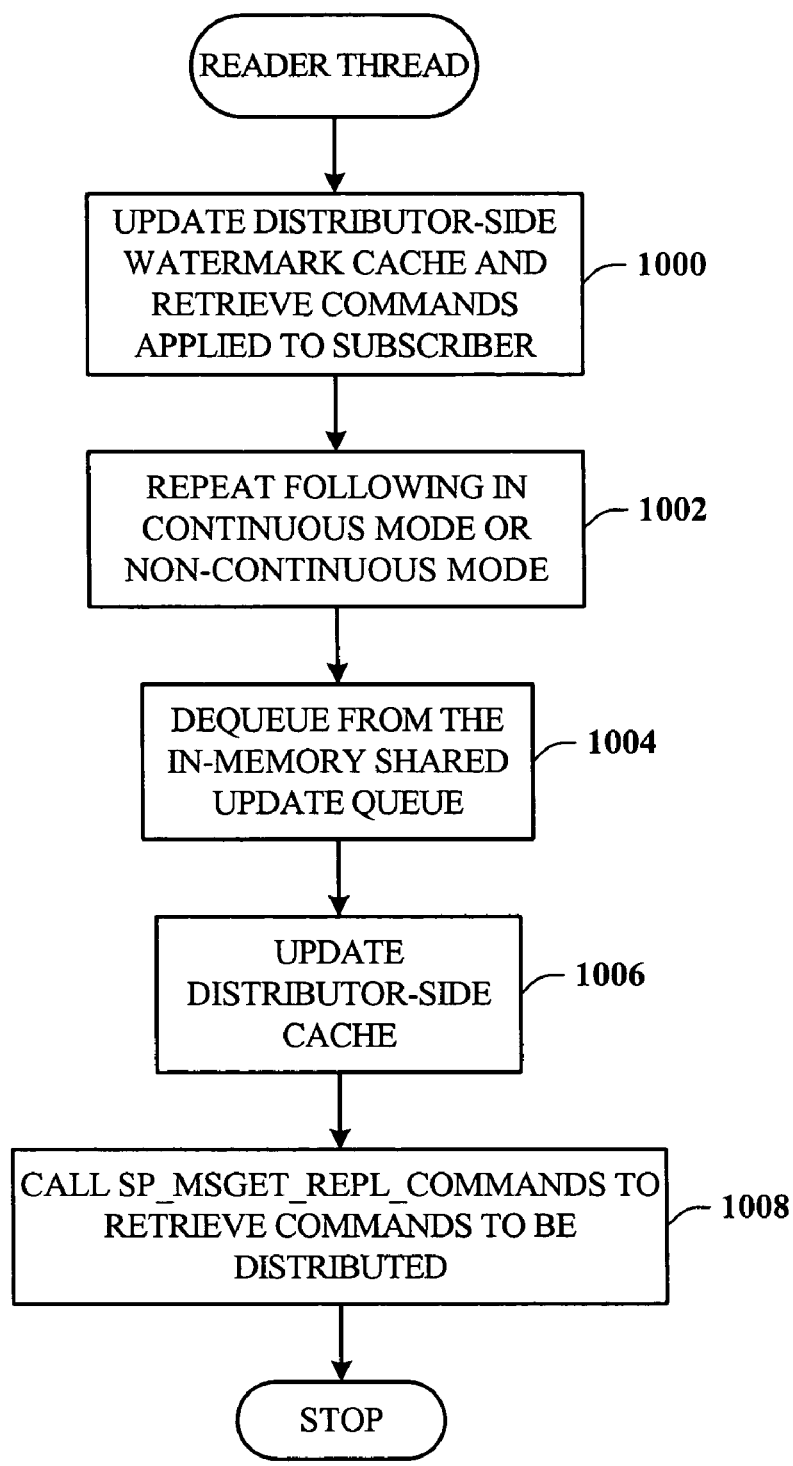
FIG. 10 illustrates a flow chart of a process of a reader thread in accordance with the present invention.

Referring now to FIG. 10, there is illustrated a flow chart of a process of a reader thread in accordance with the present invention. As indicated at 1000, the reader thread is responsible for updating the distributor side watermark cache (MScached_peer_lsns) and retrieving the commands to be applied at the subscriber. At 1002, the following steps are repeated by the reader thread at regular intervals (i.e., a continuous mode), or until no more data needs to be processed (i.e., a non-continuous mode). At 1004, the reader thread dequeues from the shared update queue. At 1006, the distributor side cache is updated. At 1008, sp_MSget_repl_commands is called to retrieve the commands to be distributed. The procedure joins with MScached_peer_lsns to determine which commands have not yet been delivered to the subscriber. This is done as a best effort to reduce the number of commands sent over the network to the subscriber. It is not exact because the watermark table at the subscriber has not been locked until the writer thread queries the subscriber side watermark table for the first time. (Note that the table is not locked in the initialization phase above).

Figure 11:
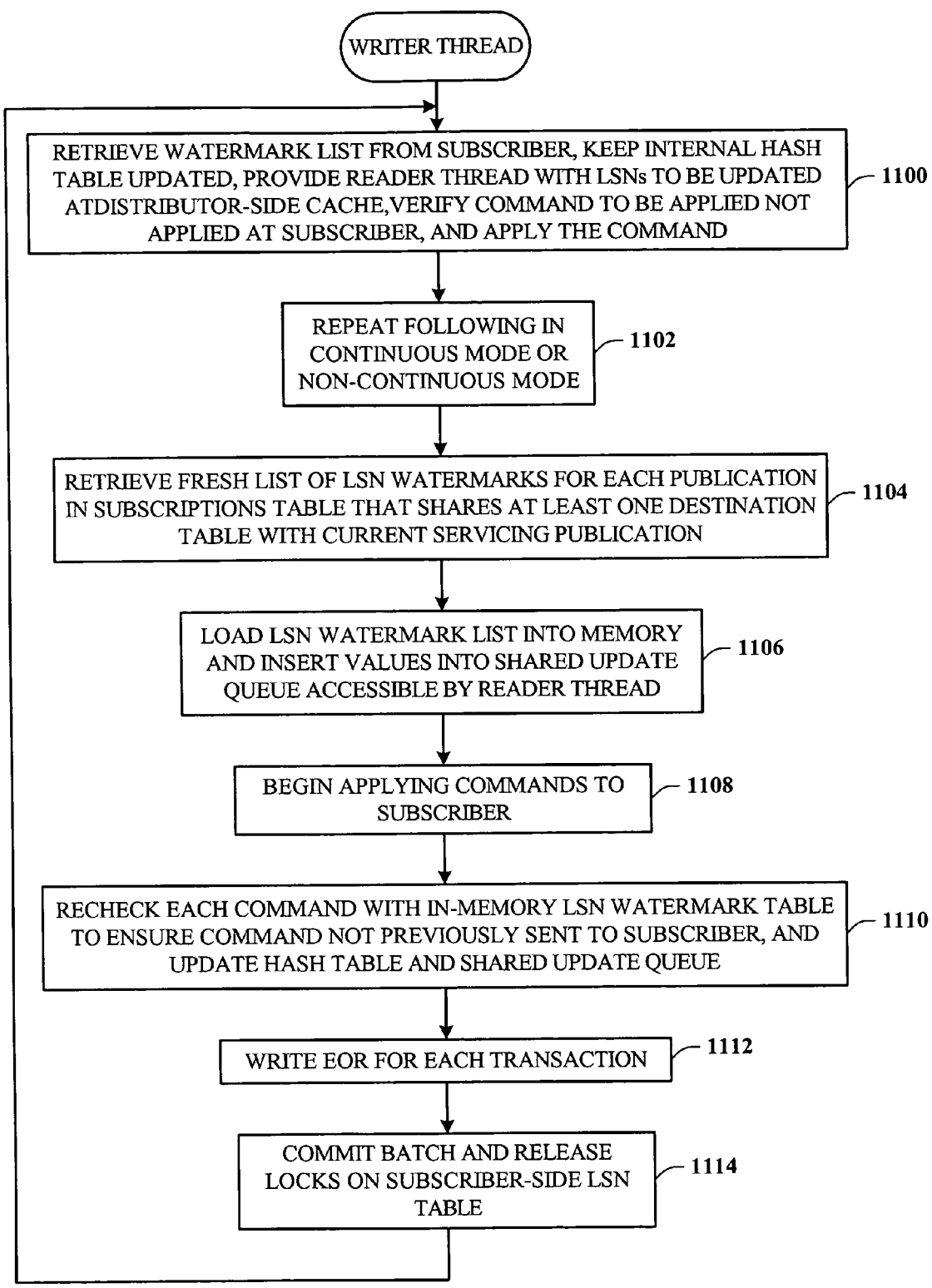
FIG. 11 illustrates a flow chart of a process of a writer thread in accordance with the present invention.

Referring now to FIG. 11, there is illustrated a flow chart of a process of a writer thread in accordance with the present invention. As indicated at 1100, the writer thread is responsible for retrieving the watermark list from the subscriber (MSpeer_lsns), keeping the internal hash table updated, providing the reader thread with LSNs to be updated at the distributor side cache, verifying that the command to be applied has not been applied at the subscriber, and then finally, applying the command. As further indicated at 1102, the following steps are repeated by the writer thread at regular intervals (i.e., a continuous mode), or until no more data needs to be processed (i.e., a non-continuous mode). At 1104, a fresh list of LSN watermarks is retrieved for each publication in the MSpeer_subscriptions table that shares at least one destination table with the current servicing publication. At this time, all of the LSN values are locked to prevent other agents from updating them. By locking the LSN values, other agents are prevented from retrieving the watermarks. Other agents must now wait for the first agent to complete the transaction. In essence, the duration for which the lock is held determines the granularity with which various distribution agents can alternate distributing to the same subscriber.

Because data can be routed via any path in the topology, starvation of other distribution agents is not an issue. Basically, an agent only holds the lock when it is replicating data. In fact, the agent may be replicating the data for all other agents attempting to acquire the lock. This means that the subscriber will be current when other agents attempt to replicate. Thus, there is no starvation. It is to be appreciated, however, that a command-line parameter can be provided that specifies how many batches are queried before unlocking/relocking the MSpeer_lsns table. At 1106, the LSN watermark list is loaded into memory and the values inserted into the shared update queue accessible by the reader thread. At 1108, the agent begins to apply commands to the subscriber. As the commands are applied, each command is checked with the in-memory LSN watermark hash table to ensure that the command has not been sent to the subscriber before, as indicated at 1110. As the commands are applied, the hash table and the shared update queue are also updated. At 1112, an EOR is written for each transaction. The information for the EOR is provided with the commands retrieved by the call to sp_MSget_repl_commands. Since peer-to-peer replication is based on the fact that every transaction is well known, the original transactions are preserved as the commands flow throughout the topology. To meet this requirement, each original transaction is followed with an EOR in the log. This allows committing N number of transactions, yet still preserving the original transaction information. A new transaction is detected a change in any of the following data that accompanies the command:

[Server Name], [DB Name], [Publication ID], [DB Version], [Last TLSN]

Note that an EOR is written on an LSN change even if the other data remains the same because the EOR information is preserved at the original transaction level to ensure data convergence. On COMMIT of a batch, the locks are released on the subscriber side LSN table, as indicated at 1114, and flow is back to the input of 1100.

Self-Forwarding Commands

Figure 12:
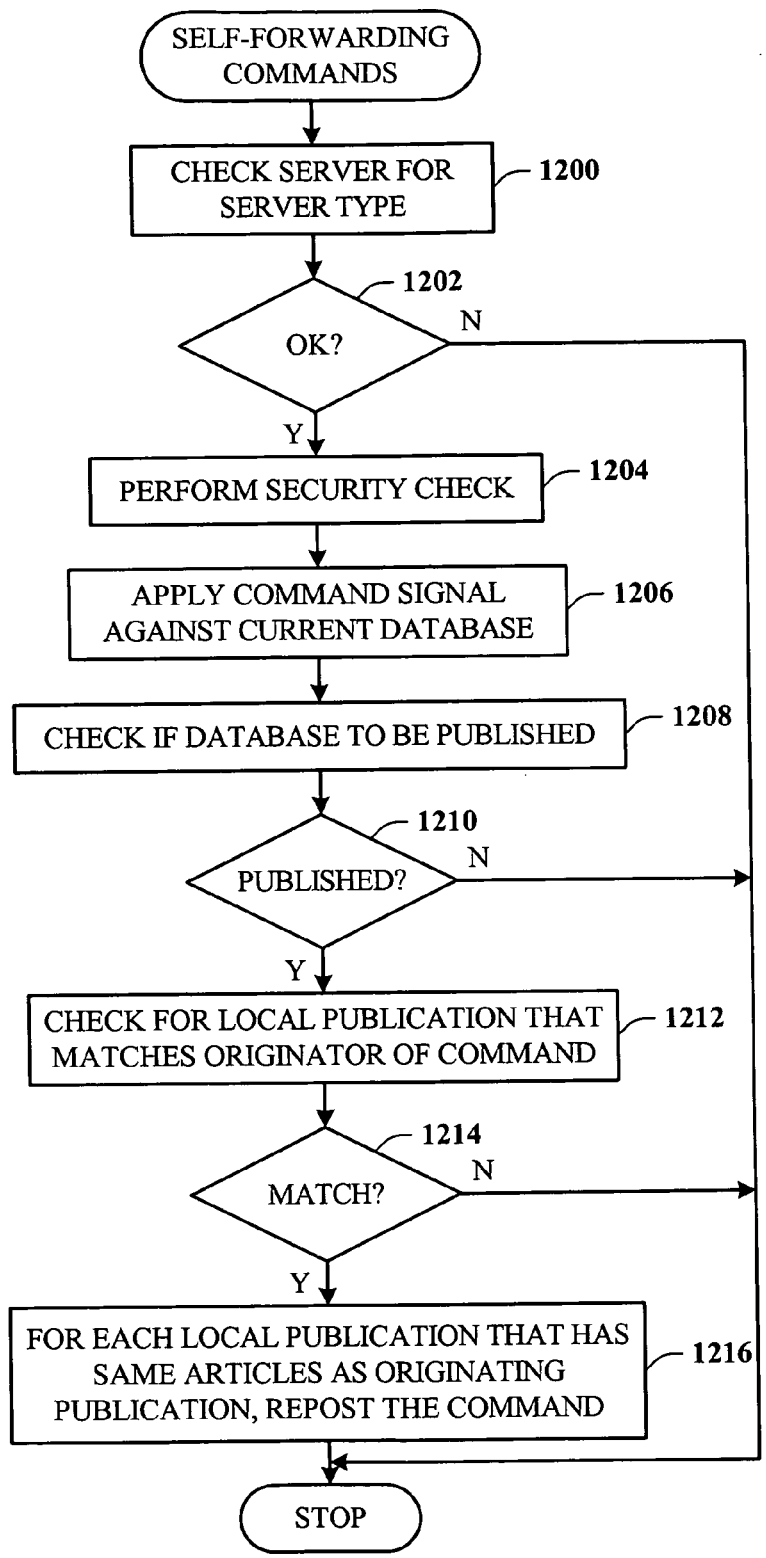
FIG. 12 illustrates a flow chart for a process associated with self-forwarding commands.

Referring now to FIG. 12, there is illustrated a flow chart for a process associated with self-forwarding commands. With the introduction of peer-to-peer and the global metadata required to support, there is provided a method of forwarding T-SQL (Transact-SQL) commands throughout the topology. These self-forwarding commands abide by the same rules as any other commands in a peer-to-peer scenario—never redeliver a command that has already been applied to a subscriber, and allow the rerouting of any command through any replication pathway. These self-forwarding commands are used to insert and forward all required meta-data throughout the topology.

The logic to forward a command is based on the following rules. At 1200, check for the server type, which information is embedded in the posted command. If an applicable server, flow is from 1202 to 1204 to perform a security check (sysadmin or dbo of subscriber database); otherwise skip all logic and exit to a Stop block. At 1206, the command is applied against the current database. At 1210, a determination is made as to whether the database is published. If so, a check is made for a local publication that matches the originator of the command, as indicated at 1212; else, exit to the Stop block. If a match is found, flow is from 1214 to 1216, where for each local publication (i.e., the current database publications) that has the same articles as the originating publication, repost the command. This effectively forwards the command to the next set of subscribers. Otherwise, flow is from 1214 to exit to the Stop block. From 1216, the process ends at the Stop block.

A snapshot agent performs all of the same processing for a peer-to-peer publication as it would for a regular transactional publication by making a copy of the data being replicated at a specific point in time, except that it calls a publisher side procedure to retrieve the self-forwarding commands containing the global meta-data. The snapshot agent then loads these commands into the distribution database so they can be forwarded and applied at each subscriber.

DDL Design Extensions

DDL (Data Definition Language) in a peer-to-peer environment is supported in two forms: Online DDL and Offline DDL. Two forms of DDL are needed in this environment, because of the complex topologies that are possible in peer-to-peer scenarios. Each node is a Publisher, Subscriber and a Re-Publisher. When a table is altered at a database A, custom/auto processes are regenerated. The subscription that database A has to other nodes neither has updated processes nor do the publications at other nodes know that new processes and commands are needed until they receive the DDL. A set of DDL commands is supported in Online mode (i.e., sites continue to make changes) and Offline mode (require system to be quiesced).

In a peer-to-peer environment, when DDL is issued at one node in the topology it is applied to that node and a DDL trigger fires. This trigger posts the DDL command along with self-forwarding commands to recreate the auto/custom processes at each subscriber. The log reader then picks up the DDL and all of the auto/custom process definitions and sends them to the distribution database. Once a subscriber to the publication begins to synchronize, they will apply the commands and the agent will then check to see if the subscriber is a re-publisher. If so, it will force the posting of self-forwarding commands to create the auto/custom processes for its own subscribers.

Online DDL are table modifications that can be done when the entire topology is on-line. All sites can continue to perform updates while these operations are performed. The following DDL statements are allowed in an Online mode: ADD COLUMN, and ALTER COLUMN (with implicit cast). Note that only ALTER COLUMN statements that are moving to a data type that will implicitly cast can be performed on-line. This is to support DML (Data Manipulation Language) procedures.

Offline DDL is the less useable of the two forms of DDL in peer-to-peer. Offline DDL includes the following statements: DROP COLUMN, and ALTER COLUMN (requiring conversion or explicit cast). The reason these DDL statements cannot be supported in an Online fashion is that the old procedures and commands in the distribution database will not work against the old and newly altered schema of the base table. In these scenarios, the user must perform the following steps: quiesce the system, including all nodes involved in multi-node replication (this can be detected in a separate check-in); ensure that all DDLs are performed in one transaction; and, no new DDL or DML can be performed until all auto/custom processes have been regenerated/received at each node (this can be detected in a separate check-in).

P2P Setup and Configuration

Setup of a peer-to-peer topology involves the same process as setting up a bi-directional topology. The only difference is in the @enabled_for_P2P parameter. In a three-node topology, the user creates a publication at node "A" using sp_addpublication; specify a value of TRUE for the parameter @enabled_for_P2P. A value of TRUE specifies that changes made on the publication database can flow through a peer-to-peer topology. A value of FALSE (the default) specifies that the publication can be used only in a standard transactional replication topology (including a republishing topology or one that uses updating subscriptions). The user then creates a push or well-known pull subscription at databases "B" and "C" to the publication from "A". The initial snapshot is generated and applied such that now all of the databases have the same schema and data. A publication is then created at node "B" by specifying a value of TRUE for @enabled$_{13}$ for_P2P. A push or well-known pull subscription is then created at databases "A" and "C" to the publication from "A". The initial snapshot is generated and applied. Now, all of the databases have the same schema and data. A publication at node "C" is created specifying a value of TRUE for @enabled_for_P2P. A push or well-known pull subscription at databases "A" and "B" is then created to the publication from "A". The initial snapshot is generated and applied, such that now all of the databases have the same schema and data.

When a node joins a peer-to-peer configuration as a subscriber, there is provided a validation scheme to ensure the subscription can indeed happen. This involves tracking all the originating publishing publications and the republishing publications and checking to see if there is any filter defined that would restrict the data flow, and if any of the re-publishers (subscribers) do not have the proper flags enabled. To validate whether a replicated system is in a consistent state, SQL server supports several methods of verification including row counts and checksums. This can be applied for peer-to-peer transaction replication.

Figure 13:
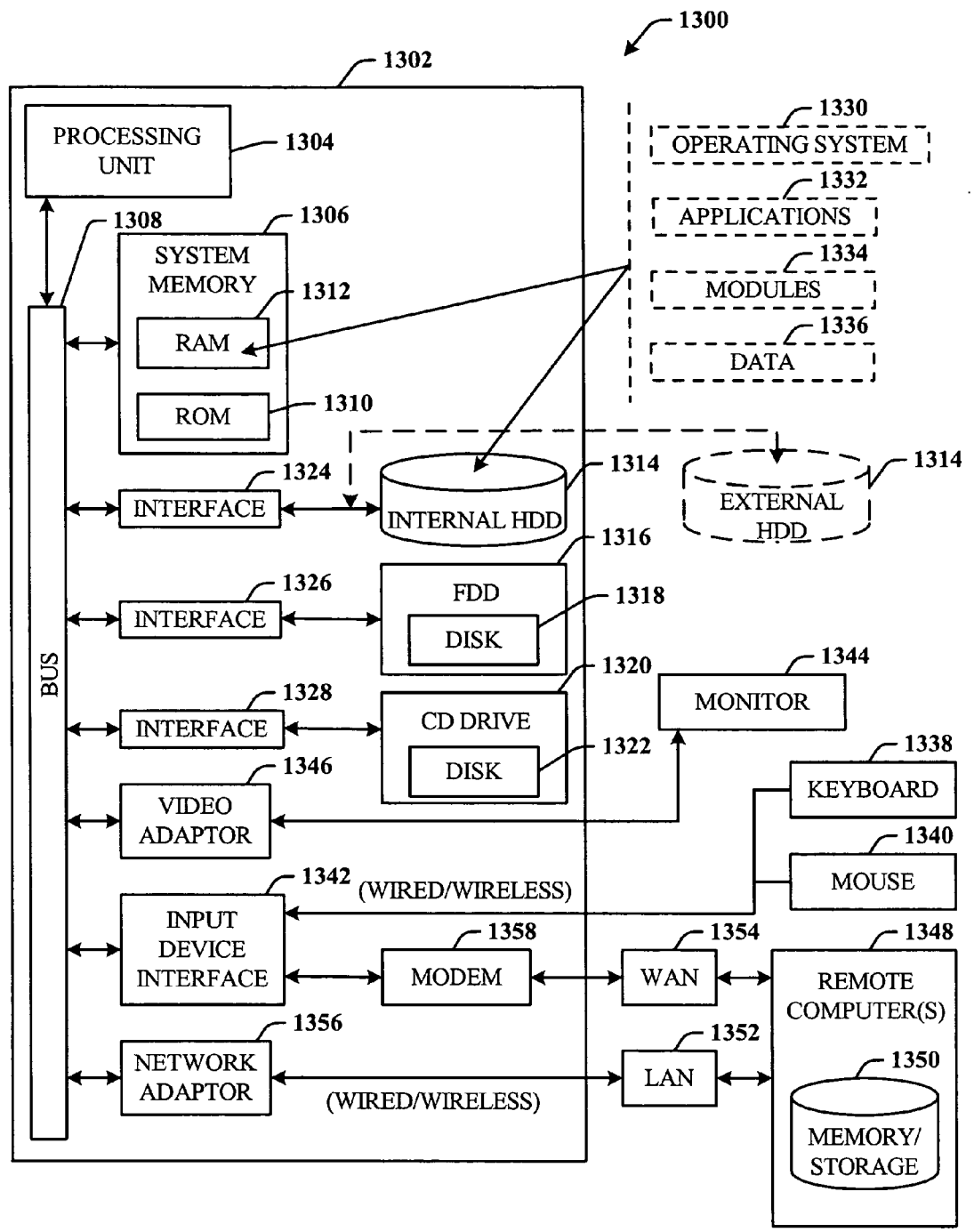
FIG. 13 illustrates a block diagram of a computer operable to execute the disclosed architecture.

Referring now to FIG. 13, there is illustrated a block diagram of a computer operable to execute the disclosed architecture. In order to provide additional context for various aspects of the present invention, FIG. 13 and the following discussion are intended to provide a brief, general description of a suitable computing environment 1300 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices.

The illustrated aspects of the invention may also be practiced in distributed computing environments where certain tasks are performed by remote processing devices that are linked through a communications network. In a distributed computing environment, program modules may be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 13, there is illustrated an exemplary environment 1300 for implementing various aspects of the invention that includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 may be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 may also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the present invention.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312.

It is appreciated that the present invention can be implemented with various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but may be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers etc.

The computer 1302 may operate in a networked environment using logical connections via wired and/or wireless communications to one or more remote computers, such as a remote computer(s) 1348. The remote computer(s) 1348 may be a workstation, a server computer, a router, a personal computer, portable computer, microprocessor-based entertainment appliance, a peer device or other common network node, and typically includes many or all of the elements described relative to the computer 1302, although, for purposes of brevity, only a memory storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices, and companies, and facilitate enterprise-wide computer networks, such as intranets, all of which may connect to a global communication network, e.g., the Internet.

When used in a LAN networking environment, the computer 1302 is connected to the local network 1352 through a wired and/or wireless communication network interface or adapter 1356. The adaptor 1356 may facilitate wired or wireless communication to the LAN 1352, which may also include a wireless access point disposed thereon for communicating with the wireless adaptor 1356. When used in a WAN networking environment, the computer 1302 can include a modem 1358, or is connected to a communications server on the LAN, or has other means for establishing communications over the WAN 1354, such as by way of the Internet. The modem 1358, which may be internal or external and a wired or wireless device, is connected to the system bus 1308 via the serial port interface 1342. In a networked environment, program modules depicted relative to the computer 1302, or portions thereof, may be stored in the remote memory/storage device 1350. It will be appreciated that the network connections shown are exemplary and other means of establishing a communications link between the computers may be used.

The computer 1302 is operable to communicate with any wireless devices or entities operably disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication may be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11b) or 54 Mbps (802.11a) data rate or with products that contain both bands (dual band), so the networks can provide real-world performance similar to the basic 10 BaseT wired Ethernet networks used in many offices.

Figure 14:
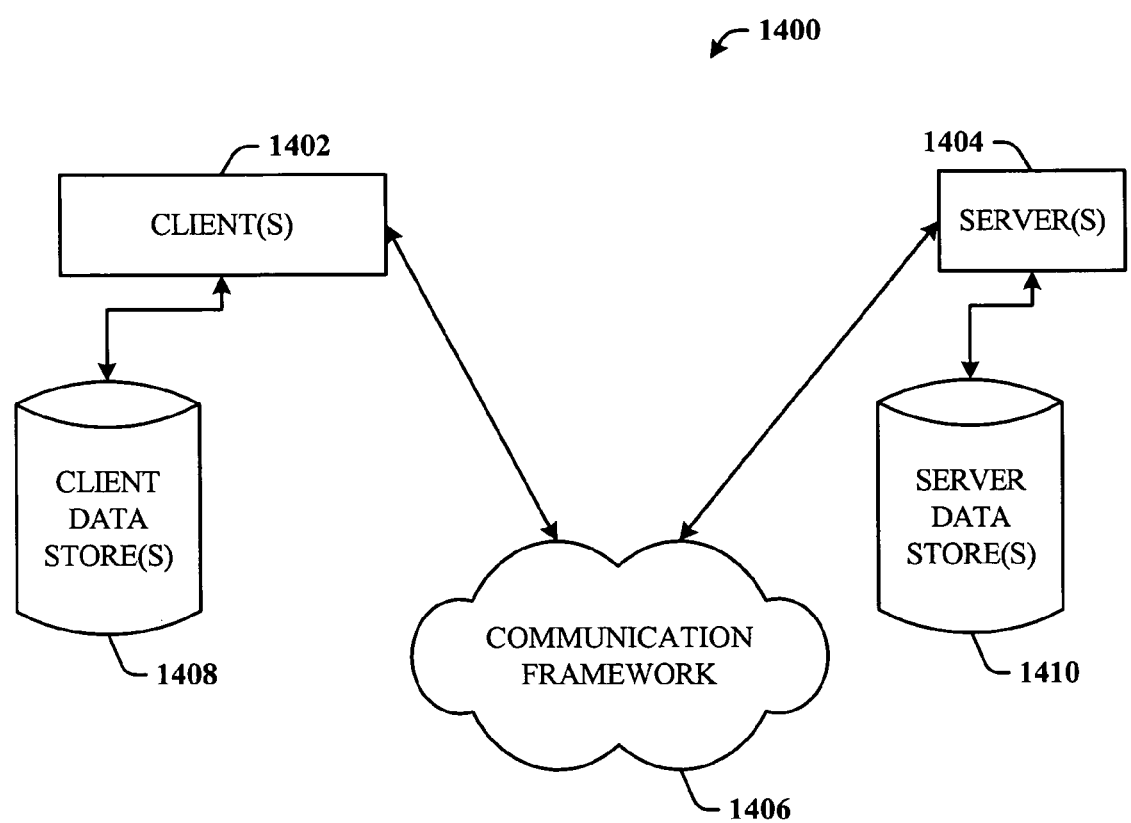
FIG. 14 illustrates a schematic block diagram of an exemplary computing environment in accordance with the present invention.

Referring now to FIG. 14, there is illustrated a schematic block diagram of an exemplary computing environment 1400 in accordance with the present invention. The system 1400 includes one or more client(s) 1402. The client(s) 1402 can be hardware and/or software (e.g., threads, processes, computing devices). The client(s) 1402 can house cookie(s) and/or associated contextual information by employing the present invention, for example. The system 1400 also includes one or more server(s) 1404. The server(s) 1404 can also be hardware and/or software (e.g., threads, processes, computing devices). The servers 1404 can house threads to perform transformations by employing the present invention, for example. One possible communication between a client 1402 and a server 1404 may be in the form of a data packet adapted to be transmitted between two or more computer processes. The data packet may include a cookie and/or associated contextual information, for example. The system 1400 includes a communication framework 1406 (e.g., a global communication network such as the Internet) that can be employed to facilitate communications between the client(s) 1402 and the server(s) 1404.

Communications may be facilitated via a wired (including optical fiber) and/or wireless technology. The client(s) 1402 are operably connected to one or more client data store(s) 1408 that can be employed to store information local to the client(s) 1402 (e.g., cookie(s) and/or associated contextual information). Similarly, the server(s) 1404 are operably connected to one or more server data store(s) 1410 that can be employed to store information local to the servers 1404.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates data replication, comprising:
    a source component of a source node that generates state change information;
    a tagging component that tags the state change information with unique source information;
    a propagation component that propagates the state change information from the source node to a destination node;
    at least one of the source component, the tagging component, and the propagation component provides the following:
        a retrieval of a version of a publisher node database;
        a build of a cache of one or more articles;
        a load of publication options for each of the one or more articles;

a reader thread that updates a distributor side watermark cache and retrieves commands to be applied to a subscriber node; and a writer thread that performs an update of an internal hash table, a verification that a command has not been previously applied to the subscriber node, and an application of the command to the subscriber node.

2. The system of claim 1, the unique source information includes data that represents at least one of the originating source node, originating database, and originating transaction.

3. The system of claim 1, the state change information is related to a local change where the unique source information is applied during at least one of commit phase and a harvesting phase.

4. The system of claim 1, the state change information is related to a non-local change where the unique source information is applied at the destination node in a manner that preserves the original transaction boundary.

5. A computer readable medium having stored thereon computer executable instructions for carrying out the system of claim 1.

6. A server employing the system of claim 1.

7. The system of claim 1, the unique source information is written to a log such that a harvesting agent can detect unique source information and the associated state change information.

8. The system of claim 1 facilitates a plurality of nodes connected in a peer-to-peer topology that provides transactional consistency.

9. The system of claim 1 facilitates a plurality of nodes connected in a peer-to-peer topology that supports loops.

10. The system of claim 1 facilitates a plurality of nodes connected in a peer-to-peer ring topology.

11. The system of claim 1, the state change information is a well-known transaction.

12. The system of claim 1, a user can select one of pure transactional flow and non-transactional flow of the state change information.

13. The system of claim 1, the destination node has associated therewith unique destination information.

14. A system that facilitates data replication in a peer-to-peer topology, comprising:
    state change information that represents a change in data of a publisher node;
    a tagging component that tags the state change information with originator information of the publisher node;
    a propagation component that propagates the state change information from the publisher node to a subscriber node;
    at least one of the tagging component and the propagation component provides the following:
        a retrieval of a version of a publisher node database;
        a build of a cache of one or more articles;
        a load of publication options for each of the one or more articles;
        a reader thread that updates a distributor side watermark cache and retrieves commands to be applied to the subscriber node; and
        a writer thread that performs an update of an internal hash table, a verification that a command has not been previously applied to the subscriber node, and an application of the command to the subscriber node.

15. The system of claim 14, the publisher node includes a table that tracks each node of the topology.

16. The system of claim 14, the publisher node includes a table that tracks the originator information for a given originating publication.

17. The system of claim 14, the publisher node includes a table that tracks and maps each article in a publication.

18. The system of claim 14, further comprising a distributor that receives the state change information from the propagation component and forwards the state change information to the subscriber node.

19. The system of claim 18, the distributor is associated with a distribution database that stores commands for peer-to-peer publications.

20. The system of claim 19, the commands include an extended originator log record (EOR) command.

21. The system of claim 19, the commands have associated therewith EOR data.

22. A method of replicating data in a peer-to-peer topology, comprising:
    querying a publisher node database to determine if a publication data exists;
    tagging the publication data with originator information to create tagged publication data;
    querying a subscriber node to determine if publication is enabled;
    propagating the tagged publication data to the subscriber node;
    retrieving a version of the publisher node database;
    building a cache of one or more articles;
    loading publication options for each of the one or more articles;
    providing a reader thread that updates a distributor side watermark cache and retrieves commands to be applied to the subscriber node; and
    providing a writer thread that performs,
        updating of an internal hash table;
        verifying that a command has not been previously applied to the subscriber node; and
        applying the command to the subscriber node.

23. The method of claim 22, further comprising tagging a local command with the version of the publisher node database.

24. The method of claim 22, further comprising forwarding non-local commands to a distribution database in accordance with publication options.

25. The method of claim 22, further comprising forwarding all local commands to a distribution database.

26. The method of claim 22, further comprising creating a hash table of watermarks for each publication of the subscriber node that shares at least one destination table with the publication.

27. A computer-readable medium having computer-executable instructions for performing a method of replicating data in a peer-to-peer topology, the method comprising:
    querying a publisher node database to determine if a publication data exists;
    tagging the publication data with originator information to create tagged publication data;
    generating a log of log records at the publisher node to record replication information;
    querying a subscriber node to determine if publication is enabled;
    propagating the tagged publication data to the subscriber node;
    retrieving a version of the publisher node database;
    building a cache of one or more articles;
    loading publication options for each of the one or more articles;

providing a reader thread that updates a distributor side watermark cache and retrieves commands to be applied to the subscriber node; and providing a writer thread that performs,
  updating of an internal hash table;
  verifying that a command has not been previously applied to the subscriber ode; and
  applying the command to the subscriber node.

28. The method of claim 27, the log record comprises log data that includes at least one of an originating server name, an originating publisher database name, an originating publisher database version, and an original transaction watermark.

29. The method of claim 27, further comprising tagging the publication data at a node that is remote from the publisher node.

30. A system that facilitates data replication, comprising:
  means for querying a publisher node database to determine if a publication data exists;
  means for tagging the publication data with originator information to create tagged publication data;
  means for generating a log of log records at the publisher node to record replication information;
  means for querying a subscriber node to determine if publication is enabled;
  means for propagating the tagged publication data to the subscriber node;
  means for retrieving a version of the publisher node database;
  means for building a cache of one or more articles;
  means for loading publication options for each of the one or more articles;
  means for providing a reader thread that updates a distributor side watermark cache and retrieves commands to be applied to the subscriber node; and
  means for providing a writer thread that performs,
    updating of an internal hash table;
    verifying that a command has not been previously applied to the subscriber ode; and
    applying the command to the subscriber node.

31. The system of claim 30, further comprising means for creating a hash table of watermarks for each publication of the subscriber node that shares at least one destination table with the publication data.

32. The system of claim 30, further comprising means for providing a reader thread that updates a distributor side watermark cache and retrieves commands to be applied to the subscriber node.

33. The system of claim 30, the means for tagging and means for propagating are combined as a single component.

34. The system of claim 33, the single component is at least one of integral to a server engine and separate from the server engine.

* * * * *